(12) United States Patent
Pisek et al.

(10) Patent No.: US 7,669,042 B2
(45) Date of Patent: Feb. 23, 2010

(54) PIPELINE CONTROLLER FOR CONTEXT-BASED OPERATION RECONFIGURABLE INSTRUCTION SET PROCESSOR

(75) Inventors: Eran Pisek, Plano, TX (US); Jasmin Oz, Plano, TX (US); Yan Wang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 11/150,427

(22) Filed: Jun. 10, 2005

(65) Prior Publication Data

US 2006/0184779 A1 Aug. 17, 2006

Related U.S. Application Data

(63) Continuation-in-part of application No. 11/123,313, filed on May 6, 2005.

(60) Provisional application No. 60/653,968, filed on Feb. 17, 2005, provisional application No. 60/668,743, filed on Apr. 6, 2005.

(51) Int. Cl.
*G06F 9/30* (2006.01)
(52) U.S. Cl. ...................... 712/241; 712/245
(58) Field of Classification Search ................ 712/241, 712/229, 205, 35, 233, 324, 150
See application file for complete search history.

(56) References Cited

U.S. PATENT DOCUMENTS 5,303,355 A * 4/1994 Gergen et al. ............... 712/241
5,579,493 A * 11/1996 Kiuchi et al. ............... 712/207
6,691,799 B2 * 2/2004 Kuhnle et al. ............... 173/132
6,766,446 B2 * 7/2004 Ganapathy et al. .......... 712/241
6,795,930 B1 * 9/2004 Laurenti et al. ............. 713/324
6,898,693 B1 * 5/2005 Singh et al. ................. 712/205
6,950,929 B2 * 9/2005 Chung et al. ................ 712/241
7,007,155 B2 * 2/2006 Mohebbi et al. .............. 712/35
7,159,103 B2 * 1/2007 Ahmad et al. ............... 712/241
7,299,342 B2 * 11/2007 Nilsson et al. .............. 712/222
7,380,112 B2 * 5/2008 Okabayashi et al. ........ 712/241
2002/0178350 A1 * 11/2002 Chung et al. ................ 712/241
2003/0120905 A1 * 6/2003 Stotzer et al. ............... 712/241

(Continued)

FOREIGN PATENT DOCUMENTS

JP 11-298959 10/1999

(Continued)

OTHER PUBLICATIONS

Jeffery H Reed, Software Radio: A Modern Approach to Radio Engineering, Prentice Hall, May 2002.*

*Primary Examiner*—Henry W. H. Tsai
*Assistant Examiner*—Cheng-Yuan Tseng

(57) ABSTRACT

An instruction execution pipeline for use in a data processor. The instruction execution pipeline comprises: 1) an instruction fetch stage; 2) a decode stage; 3) an execution stage; and 4) a write-back stage. The instruction pipeline repetitively executes a loop of instructions by fetching and decoding a first instruction associated with the loop during a first iteration of the loop, storing first decoded instruction information associated with the first instruction during the first iteration of the loop, and using the stored first decoded instruction information during at least a second iteration of the loop without further fetching and decoding of the first instruction during the at least a second iteration of the loop.

11 Claims, 9 Drawing Sheets

U.S. PATENT DOCUMENTS

2003/0207686 A1    11/2003  Ramanna et al.
2005/0102659 A1*    5/2005  Singh et al. .................. 717/150
2008/0059772 A1*    3/2008  Pisek et al. .................. 712/220
2008/0294882 A1*   11/2008  Jayapala et al. ............. 712/241

FOREIGN PATENT DOCUMENTS

JP    2000-232209    8/2000
TW      1220201      8/2004

* cited by examiner

| EVENT | | CURRENT STATE | | | | | | | | | | |
|---|---|---|---|---|---|---|---|---|---|---|---|---|
| | START | S1 | S2 | S3 | S4 | S5 | S6 | S7 | S8 | S9 | S10 | |
| E1 | S1 | S9 | S4 | S2 | | | | | | | | |
| E2 | | S2 | | | | S4 | | | S10 | | | S8 |
| E3 | | S2 | | S5 | | | S9 | | | | | |
| E4 | | S10 | S9 | | | | | | S8 | | | S8 |
| E5 | | | | | S9 | S3 | S9 | | | | S10 | |
| E6 | | | | | S2 | | S5 | | S7 | | | S7 |
| E7 | | | | S2 | | | S5 | S6 | | | | STOP |

PIPELINE CONTROLLER FOR CONTEXT-BASED OPERATION RECONFIGURABLE INSTRUCTION SET PROCESSOR

CROSS-REFERENCE TO RELATED APPLICATION AND CLAIM OF PRIORITY

The present invention is related to those disclosed in U.S. Prov. Pat. No. 60/653,968, filed Feb. 17, 2005, entitled "Context-Based Operation Reconfigurable Instruction Set Processor", and U.S. Prov. Pat. No. 60/668,743, filed Apr. 6, 2005, entitled "A Control Scheme For Context-Based Operation Reconfigurable Instruction Set Processor". Prov. Pat. Nos. 60/653,968 and 60/668,743 are assigned to the assignee of the present application and are incorporated by reference into the present disclosure. The present application claims priority under 35 U.S.C. §119(e) to U.S. Provisional Patent Nos. 60/653,968 and 60/668,743.

The present application is a continuation-in-part of U.S. patent application Ser. No. 11/123,313, filed on May 6, 2005, entitled "Context-based Operation Reconfigurable Instruction Set Processor and Method of Operation." application Ser. No. 11/123,313 is assigned to the assignee of the present application and is incorporated by reference into the present application as if fully set forth herein. The present application claims priority under 35 U.S.C. §120 to U.S. patent application Ser. No. 11/123,313.

TECHNICAL FIELD OF THE INVENTION

The present invention relates generally to data processors and, more specifically, to a register for controlling an execution pipeline in a data processor.

BACKGROUND OF THE INVENTION

Data processors are used in nearly every type of modern electronic device, including consumer electronics, industrial machinery, scientific apparatuses and communication networks. However, the performance and degree of complexity of the data processors (or microprocessors) used in different applications may vary widely. The speed and power requirements of a particular application are important in determining the type of data processor used.

The type of data processor used is particularly important in software-defined radio (SDR) implementations. An SDR device uses reconfigurable hardware that may be programmed over the air to operate under different wireless protocols. For example, an SDR transceiver in a wireless laptop computer may be configured by a first software load to operate in an IEEE-802.11x wireless network and may be reconfigured by a second software load to operate in a CDMA2000 wireless network.

There are six main types of data processors in common use: 1) digital signal processors, 2) reduced instruction set computers, 3) complex instruction set computers, 4) field programmable gate arrays, 5) application specific integrated circuits, and 6) application specific instruction set processors. Each of these types of data processors has particular advantages and particular disadvantages.

A digital signal processor (DSP) is a general-purpose processor optimized to efficiently execute digital signal processing operations, such as a Multiply-Accumulate operation for finite impulse response (FIR) filtering and Fast Fourier Transform (FFT) operations. A DSP implements many sophisticated addressing modes to cover many of the DSP calculation requirements, such as bit reverse addressing mode for FFT, index addressing for FIFO devices, and the like. Examples of DSPs include: 1) the MOTOROLA 56000, 56300, SC81xx, and MRC6011 processors; 2) the TEXAS INSRTUMENTS (TI) C55, C6203, C6416, and C67xx processors; 3) the ADI SHARC processors and the TIGERSHARC processors; and 4) the MORPHO MS1-64 Reconfigurable DSP.

A reduced instruction set computer (RISC) is a general purpose processor (GPP) that mainly targets control applications, such as media access control (MAC) applications. The main advantage of the RISC machine is its simplicity. As its name, a RISC processor has small instruction set, which provides more code density as well as faster change-of-flow reaction. Examples of RISC devices include: 1) ARM processors (e.g., ARM926, ARM1136J); 2) MIPS processors (e.g., MIPS32, MIPS64); 3) the IBM PowerPC 405 and 750FX processors; and 4) the MOTOROLA PowerPC 603 processors.

A complex instruction set computer (CISC) device is a general purpose processor (GPP) targeted to the general purpose applications ranging from multimedia applications to PC applications. Examples of CISC processors include: 1) the INTEL PENTIUM processors; and 2) the MOTOROLA 68000 processors.

The field programmable gate array (FPGA) is a reconfigurable hardware device based on an array of hardware cells connected through long-busses and local busses. FPGA devices are quite commonly used in wireless network base station applications and prototypes. Examples of FPGA devices include: 1) the XILINX VIRTEX IV device; and 2) the Altera Stratix II device.

An application specific integrated circuit (ASIC) is a hardware device specially designed for a specific application. An ASIC is usually very power efficient. ASIC devices are used in many wireless devices (i.e., cell phones, etc.). An application specific instruction set processor (ASIP) is an enhanced version of an ASIC device that adds more programmability to the ASIC hardware.

Each of the above-described processors has certain advantages and suffers from particular disadvantages. Digital signal processors are the most flexible type of processor, from a software point of view, in order to meet software-defined radio (SDR) requirements. However, DSP devices do not have enough MIPS performance and bit manipulation architecture to meet 3G and 4G bit-rate processing requirements. RISC processors target control applications, but are inadequate beyond baseband applications for wireless network implementations. CISC processors may have the flexibility and the MIPS performance to process baseband applications, but their poor power efficiency makes them unsuitable for handset power restrictions. FPGA devices, like CISC processors, may meet the required MIPS performance, but their poor power efficiency makes them unsuitable for handset designs.

ASIC devices are well matched to the power and cost restrictions of handset designs. However, their flexibility is too limited to make them suitable for SDR implementations. ASIP devices achieve greater flexibility than ASIC devices by adding more programmability to the application specific hardware and by introducing instruction-set processors to the hardware. However, since ASIPs are general-purpose devices, their processor core efficiency depends on the application being processed. The more control code in the application, the less efficient the ASIP will be. This results in poor performance and higher power consumption.

Additional disadvantages of the prior art processors are scalability and modularity. The software-defined radio (SDR) approach was created in order to minimize cost (design time, TTM) and power consumption and to maximize flexibility. The prior art processor implementations fail to provide an optimized combination of scalability and modularity.

The performance of a processor may also be greatly affected by the use of an instruction execution pipeline that processes instructions in stages. Modern data processors use pipelined architectures to achieve high throughput. Generally, an instruction pipeline may be represented by four stages: 1) an instruction fetch (IF) stage, 2) a decode (DE) stage, 3) an execution (EX) stage, and 4) a write-back (WB) stage. Multiple instructions may be loaded into the pipeline and be processed in parallel, rather than waiting for a first instruction to finish before processing a second instruction. For example, while the instruction fetch stage is fetching the $k^{th}$ instruction, the decode stage is decoding the (k+1) instruction, the execution stage is executing the decoded (k+2) instruction, and the write-back stage is writing to memory (or elsewhere) the result of the (k+3) instruction.

The performance improvements provided by instruction pipelines are well-known. However, the control circuitry of instruction pipelines is complicated and often introduces delays into the pipeline. Moreover, both the instruction pipeline data path circuits and the pipeline controller increase the overall power consumption of the data processor. The increased power consumption has a particularly adverse affect in battery-powered wireless device applications.

Therefore, there is a need in the art for an improved data processor design for use in a wide variety of applications. In particular, there is a need for an instruction execution pipeline for use in data processors in software-defined radio (SDR) wireless devices.

SUMMARY OF THE INVENTION

To address the above-discussed deficiencies of the prior art, it is a primary object of the present invention to provide an instruction execution pipeline for use in a data processor. According to an advantageous embodiment of the present invention, the instruction execution pipeline comprises: 1) an instruction fetch stage; 2) a decode stage; 3) an execution stage; and 4) a write-back stage. The instruction pipeline is capable of repetitively executing a loop of instructions by fetching and decoding a first instruction associated with the loop during a first iteration of the loop, storing first decoded instruction information associated with the first instruction during the first iteration of the loop, and using the stored first decoded instruction information during at least a second iteration of the loop without further fetching and decoding of the first instruction during the at least a second iteration of the loop.

According to one embodiment of the present invention, the instruction fetch stage and the decode stage are idle during the at least a second iteration of the loop.

According to another embodiment of the present invention, the instruction execution pipeline further comprises a pipeline controller capable of controlling the execution stage and the write-back stage, wherein the pipeline controller is capable of storing the first decoded instruction information associated with the first instruction.

According to still another embodiment of the present invention, the pipeline controller comprises at least one decoded instruction register capable of storing decoded instruction information associated with instructions in the loop of instructions.

According to yet another embodiment of the present invention, the pipeline controller comprises a loop register capable of storing loop control information associated with the loop of instructions.

According to a further embodiment of the present invention, the loop register comprises a Start Address field capable of storing an address associated with the first instruction.

According to a still further embodiment of the present invention, the loop register comprises an Address Length field capable of storing a length value associated with the loop of instructions.

According to a yet further embodiment of the present invention, the loop register comprises a Count field capable of storing a total number of iterations of the loop of instructions.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 2 illustrates a finite state machine (FSM) table for a data processor;

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
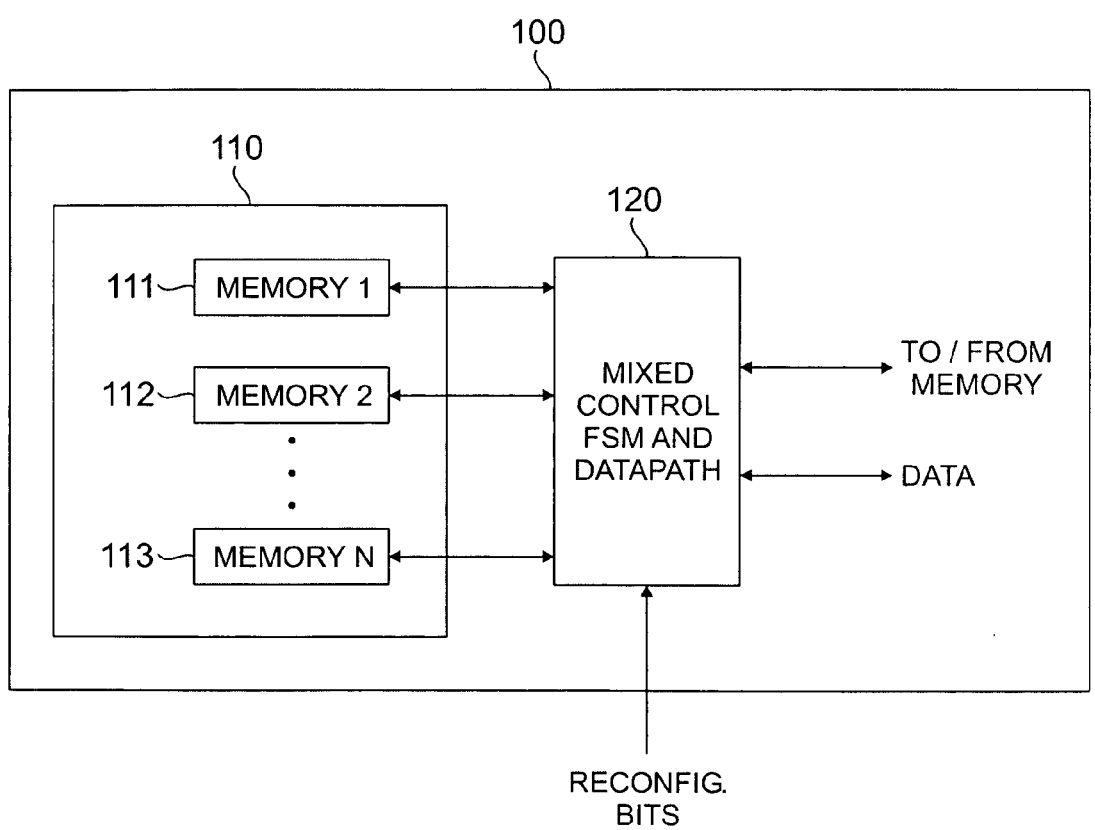
FIG. 1 is a block diagram of a conventional data processor according to an exemplary embodiment of the prior art.

FIG. 1 is a high-level block diagram of conventional data processor 100 according to an exemplary embodiment of the prior art. FIG. 1 depicts a general implementation of an application in hardware and software. Data processor 100 comprises memory 110 and control circuitry 120. Control circuitry 120 further comprises mixed control finite state machine (FSM) circuitry and datapath circuitry. Memory 110 further comprises N memory blocks, including exemplary memory blocks 111-113, which are arbitrarily labeled Memory 1, Memory 2, and Memory N.

Any data processor application may be regarded as a set of datapaths controlled and scheduled by a finite state machine (FSM), as FIG. 1 shows. A finite state machine receives input events and, in response, transitions between states and/or generates outputs. The FSM decides to which states to transition based on the current state and the received input events.

FIG. 2 illustrates finite state machine (FSM) table 200 for an exemplary data processor. FSM table 200 depicts the next state transitions performed by a FSM based on the current state (i.e., one of states S1-S10) and the received input event (i.e., one of events E1-E7). Initially, the FSM is in state S1. The column for state S1 indicates the state transitions for state S1 in response to events E1-E4.

In response to event E1 received during state S1, the FSM transitions from state S1 to state S9. In response to event E2 received during state S1, the FSM transitions from state S1 to state S2. In response to event E3 received during state S1, the FSM transitions from state S1 to state S2. In response to event E4 received during state S1, the FSM transitions from state S1 to state S10.

As FIG. 2 makes clear, there are many holes in the FSM table 200 for which no values are given. For example, for state S1, no values are given for events E5-E7. In prior art data processors, those holes, although they do not contribute to the flow of the finite state machine, must be provided for, otherwise the finite state machine will not work correctly. In the prior art data processors, the finite state machines cannot be further optimized to eliminate these holes.

Figure 3:
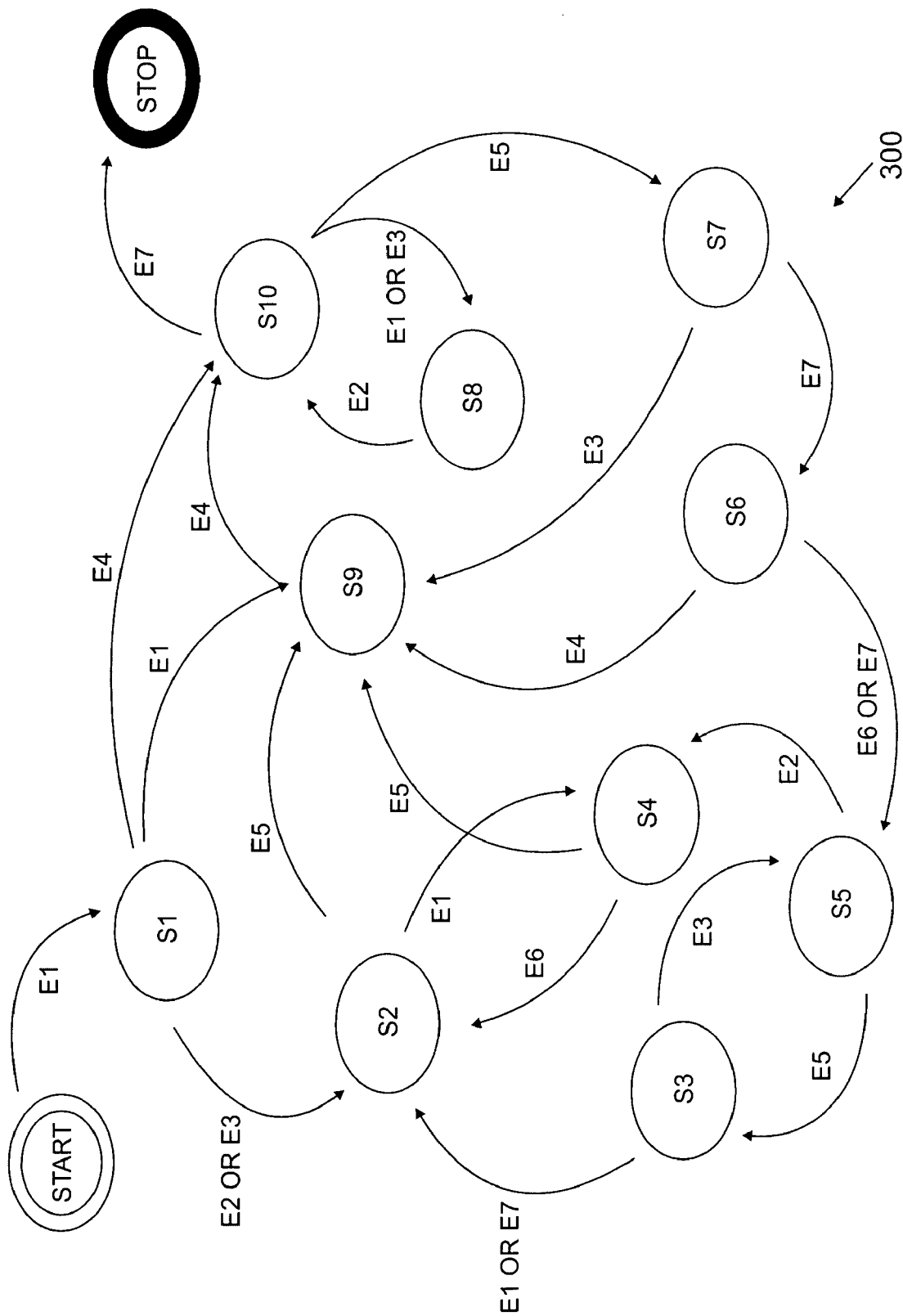
FIG. 3 is a bubble diagram corresponding to the finite state machine table in FIG. 2.

FIG. 3 illustrates bubble diagram 300, which corresponds to the finite state machine table in FIG. 2. Each of states S1-S10 is represented by a bubble and events E1-E7 cause transitions between states. These transitions are represented by the arrowed lines connecting the state bubbles. The arrowhead determines the direction of the transition.

Figure 4:
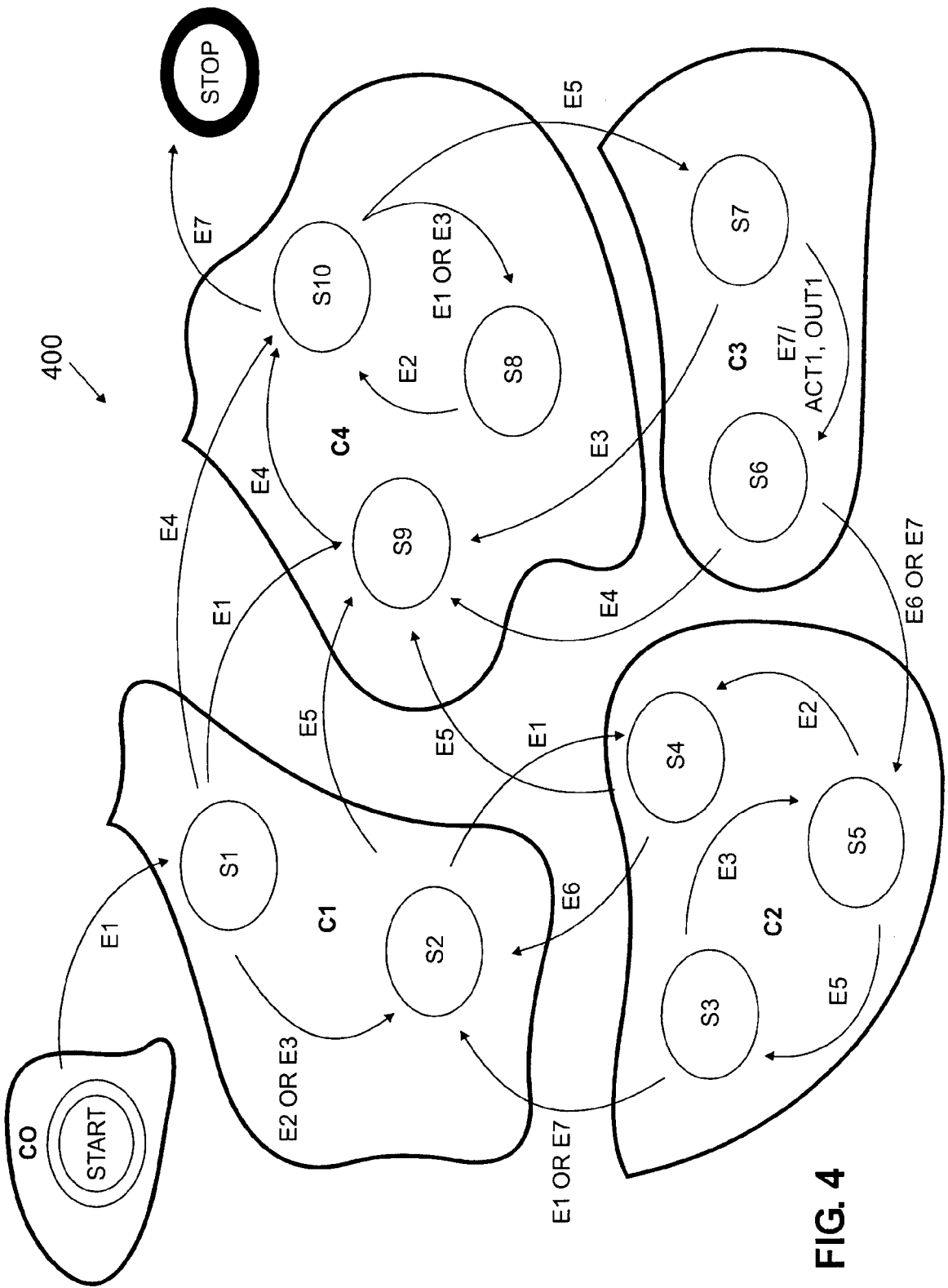
FIG. 4 is a bubble diagram showing context-based groupings of states in the finite state machine table in FIG. 2 according to an exemplary embodiment of the present invention.

It is noted that in bubble diagram 300, it is possible to group states according to contexts of execution units. For the purposes of this disclosure, a context is a group of operations and/or instructions that are related to the same function. FIG. 4 illustrates bubble diagram 400, in which states of the finite state machine table in FIG. 2 that are related to the same context are grouped together according to the principles of the present invention. The groupings of states form contexts C0, C1, C2, C3 and C4.

Each of the groupings of states in FIG. 4 may be used to create a context-based operation reconfigurable instruction set processor (CRISP) according to the principles of the present invention. Each of contexts C0-C4 comprises a minimum number of input events and a set of probable operations. Each context also has its own data path, which may comprise parallel execution units while the instruction set execution may be either in a VLIW, SIMD, microcode or other known implementation manner to increase the overall performance.

Figure 5:
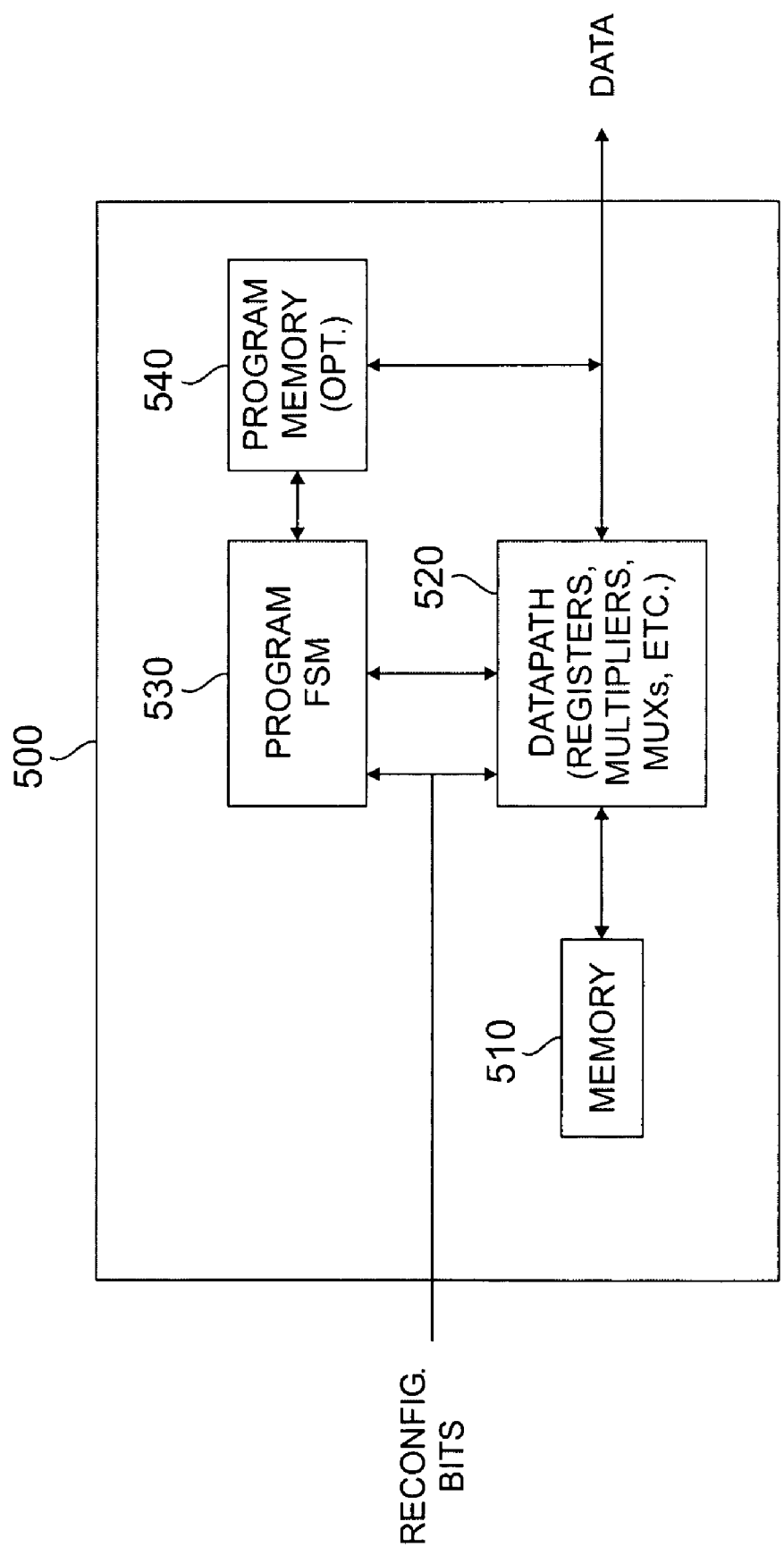
FIG. 5 is a high-level block diagram of a context-based operation reconfigurable instruction set processor according to an exemplary embodiment of the present invention.

FIG. 5 is a high-level block diagram of context-based operation reconfigurable instruction set processor (CRISP) 500, according to an exemplary embodiment of the present invention. CRISP 500 comprises memory 510, programmable data path circuitry 520, programmable finite state machine 530, and optional program memory 540. CRISP 500 is designed to implement only a subset of context-related instructions from FIG. 4 in an optimum manner. Each of the contexts C0-C4 in FIG. 4 may be implemented by a separate CRISP similar to CRISP 500. Context-based operation reconfigurable instruction set processor (CRISP) 500 defines the generic hardware block that usually consists of higher level hardware processor blocks. The principle advantage to CRISP 500 is that CRISP 500 breaks down the required application into two main domains, a control domain and a data path domain, and optimize each domain separately. By implementing a data processor application, such as a mobile station handset (e.g., cell phone, wireless laptop), using CRISP 500, the present invention at least partially overcomes the flexibility vs. power problems that adversely affect conventional data processor applications.

The control domain is implemented by programmable finite state machine 530, which may comprise a DSP, an MCU or another prior art device. Programmable FSM 530 is configured by reconfiguration bits received from an external controller (not shown). Programmable FSM 530 may execute a program stored in associated optional program memory 540. The program may be stored in program memory 540 via the DATA line from an external controller (not shown). Memory 510 is used to store application data used by data path circuitry 520.

Programmable data path circuitry 520 is divided into a set of building blocks that perform particular functions (e.g., registers, multiplexers, multipliers, and the like). Each of building blocks is both reconfigurable and programmable to allow maximum flexibility. The criteria for dividing programmable data path circuitry 520 into functional blocks depends on the level of reconfigurability and programmability required for a particular application.

Since each of the contexts C0-C4 in FIG. 4 is implemented by a separate CRISP 500 that works independently of other CRISPs, the present invention provides an efficient power management scheme that is able to shut down a CRISP when the CRISP is not required to execute. This assures that only the CRISPs that are needed at a given time are active, while other idle CRISPs do not consume any significant power.

A CRISP according to the principles of the present invention may be targeted to many applications, including, but not limited to, baseband applications in wireless devices and multimedia applications. In many applications, these contexts may be loosely-coupled independent contexts that may run concurrently with either minimum or no dependencies.

Figure 6:
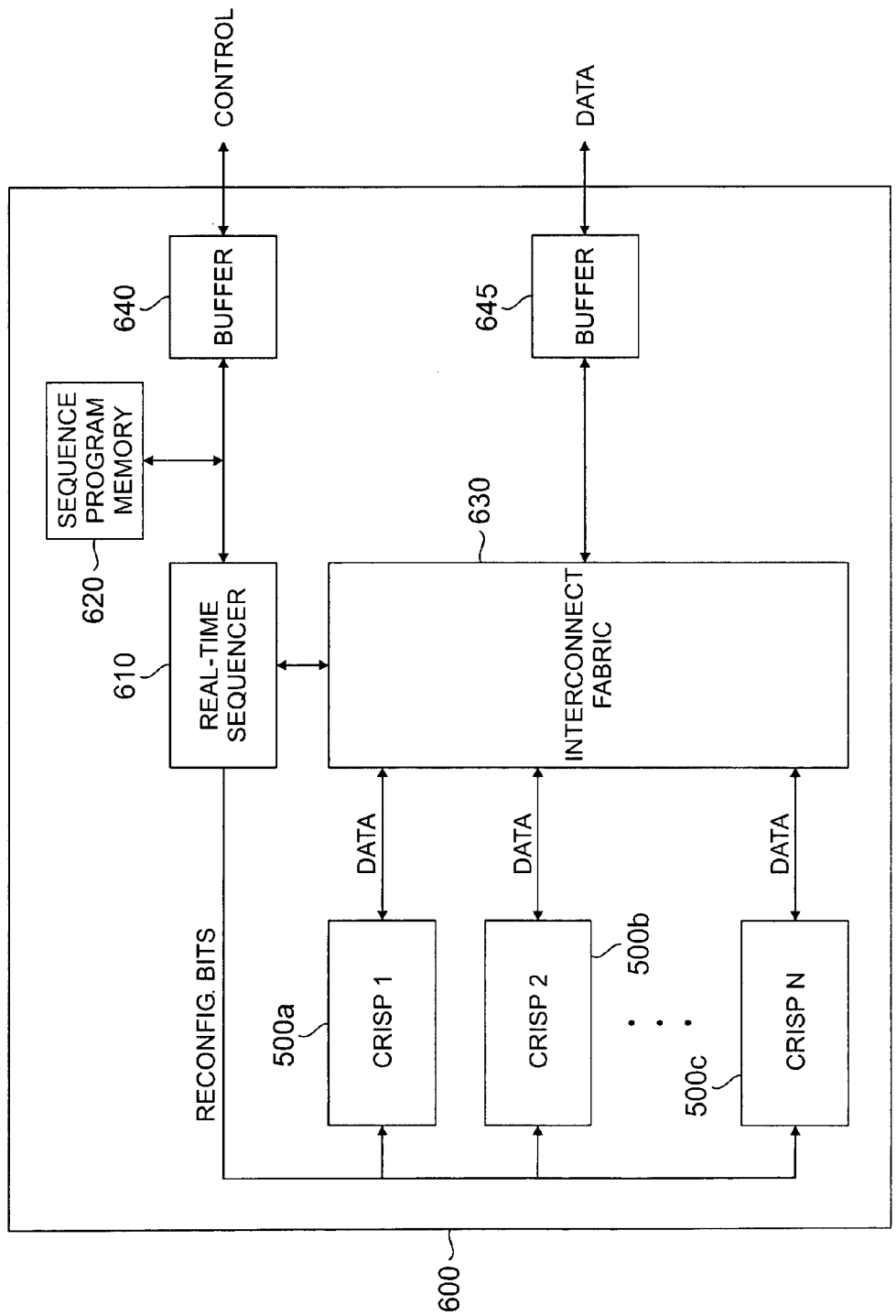
FIG. 6 is a high-level block diagram of a reconfigurable processing system comprising a plurality of context-based operation reconfigurable instruction set processors according to an exemplary embodiment of the present invention.

FIG. 6 is a high-level block diagram of reconfigurable processing system 600 according to an exemplary embodiment of the present invention. Reconfigurable processing system 600 comprises N context-based operation reconfigurable instruction set processors (CRISPs), including exemplary CRISPs 500a, 500b, and 500c, which are arbitrarily labeled CRISP 1, CRISP 2 and CRISP N. Reconfigurable processing system 600 further comprises real-time sequencer 610, sequence program memory 620, programmable interconnect fabric 630, and buffers 640 and 645.

Reconfiguration bits may be loaded into CRISPs 500a, 500b, and 500c from the CONTROL line via real-time sequencer 610 and buffer 640. A control program may also be loaded into sequence program memory 620 from the CONTROL line via buffer 640. Real-time sequencer sequences the contexts to be executed by each one of CRISPs 500a-c by retrieving program instructions from program memory 620 and sending reconfiguration bits to CRISPs 500a-c. In an exemplary embodiment, real-time sequencer 610 may comprise a stack processor, which is suitable to operate as a real-time scheduler due to its low latency and simplicity.

Reconfigurable interconnect fabric 630 provides connectively between each one of CRISPs 500a-c and an external DATA bus via bi-directional buffer 645. In an exemplary embodiment of the present invention, each one of CRISPs 500a-c may act as a master of reconfigurable interconnect fabric 630 and may initiate address access. The bus arbiter for reconfigurable interconnect fabric 630 may be internal to real-time sequencer 610.

In an exemplary embodiment, reconfigurable processing system 600 may be, for example, a cell phone or a similar wireless device, or a data processor for use in a laptop computer. In a wireless device embodiment implemented according to a software-defined radio (SDR) principles, each one of CRISPs 500a-c is responsible for executing a subset of context-related instructions that are associated with a particular reconfigurable function. For example, CRISP 500a may be configured to execute context-related instructions that process CDMA baseband signals or OFDMA baseband signals. CRISP 500b may be configured to execute context-related instructions that act as a memory controller. CRISP 500c may be configured to execute context-related instructions that perform MPEG-4 processing for multimedia applications.

A CRISP according to the principles of the present invention provides a new way of implementing reconfigurable hardware acceleration techniques. The present invention provides reconfigurability and programmability with minimum sacrifice on power efficiency. Since the CRISPs are largely independent and may be run simultaneously, the present invention has the performance advantage of parallelism without incurring the full power penalty associated with running parallel operations. The loose coupling and independence of CRISPs allows them to be configured for different systems and functions that may be shut down separately.

As noted above, the execution pipeline in a data processor may greatly affect the performance of the processor. It is desirable to minimize the complexity and the power consumption of an instruction pipeline in a configurable data processor that is used in software-defined radio (SDR) applications. Fortunately, many computation-intensive communication or multimedia algorithms, such as a Fast Fourier transform (FFT), contain repetitive operations that are performed in a loop. For many of these operations, the next instruction is identical or predictable. In other words, a small set of instructions is executed repeatedly in the algorithm. Advantageously, a context-based operation reconfigurable instruction set processor (CRISP) according to the principles of the present invention uses a smaller number of instructions than a general purpose DSP. This tends to increase the likelihood of repetitive groups of instructions (or loops) occurring in a block of code. The present invention takes advantage of these characteristic in order to provide a new mechanism for controlling the pipeline stages of a CRISP.

Figure 7:
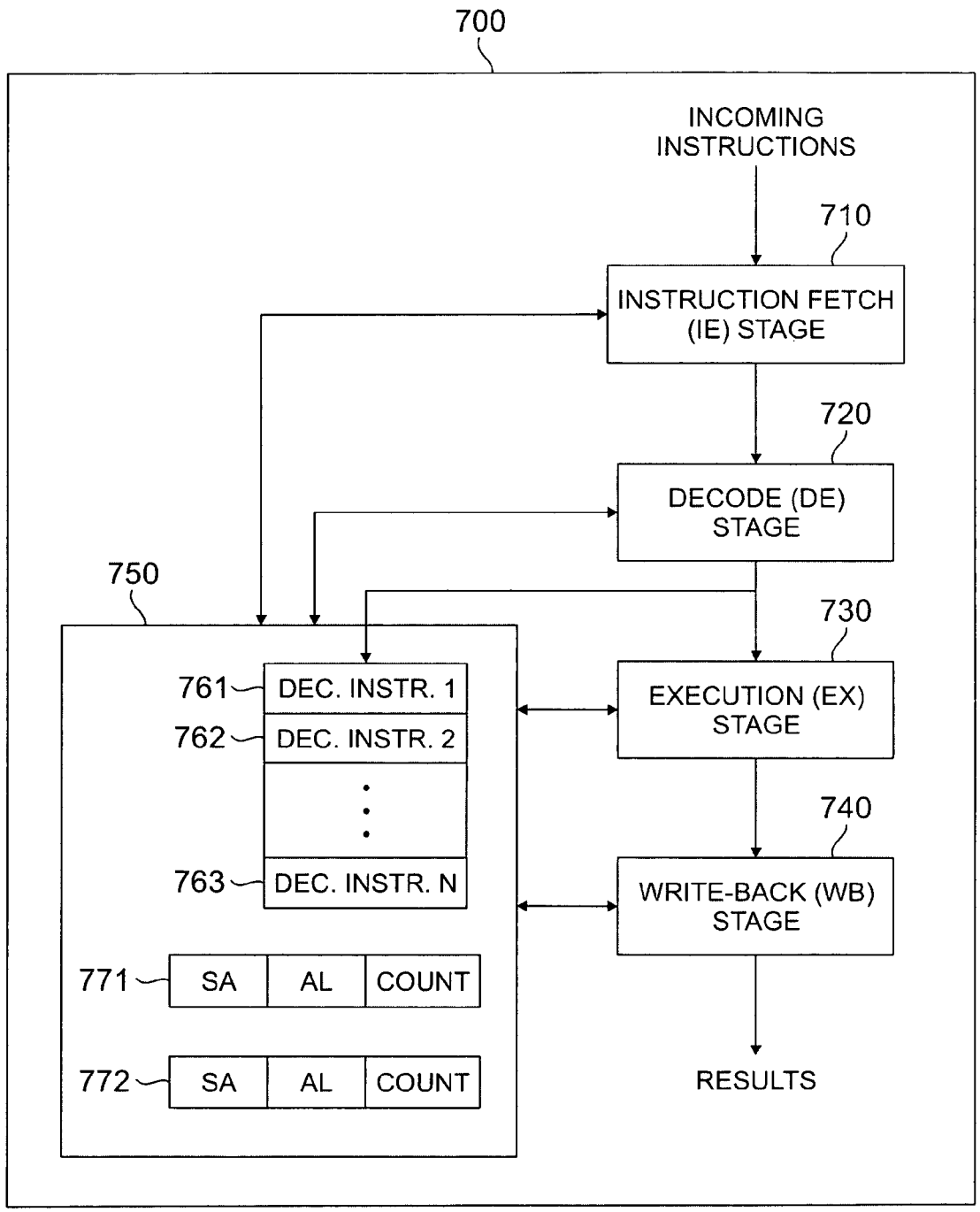
FIG. 7 is a block diagram of an execution pipeline in a context-based operation reconfigurable instruction set processor according to an exemplary embodiment of the present invention.

FIG. 7 is a block diagram of instruction execution pipeline 700 in context-based operation reconfigurable instruction set processor 500 according to an exemplary embodiment of the present invention. Instruction execution pipeline 700 comprises instruction fetch (IF) stage 710, decode (DE) stage 720, execution (EX) stage 730, write-back (WB) stage 740, and pipeline controller 750. Pipeline controller 750 comprises N decoded instruction registers, including decoded instruction register 761, decoded instruction register 762, and decoded instruction register 761. Decoded instruction registers 761-763 are arbitrarily labeled Decoded Instruction 1, Decoded Instruction 2, and Decoded Instruction 3, respectively.

Pipeline controller 750 further comprises a plurality of loop registers, including exemplary loop registers 771 and 772. Each one of loop registers 771 and 772 comprises a Start Address (SA) field, an Address Length (AL) field, and a Count field. The Start Address field indicates the start instruction memory address for a loop. The Address Length field indicates the number of instructions in the loop. The Count field indicates the number of iterations of the loop are to be executed.

As noted above, many algorithms contain a small sequence of instructions that operate on the same operands and are repeated several times. This is true of CRISP 500 according to the principles of the present invention. If a loop of, for example, three instructions is repeated ten times, then an instruction execution pipeline would have to perform thirty instruction fetches and thirty instruction decodes, where each of the three instructions is fetched and decoded ten times. Pipeline controller 750 overcomes this problem by fetching and decoding the instructions one time, storing each of the decoded instructions, and then performing the loop without further fetch operations and decode operations.

A compiler or similar device (not shown) detects a loop of instructions or a sequence of repetitive instructions in a program. The first instruction in each loop is then marked by a flag field that indicates how long the loop is and how many times it is to be repeated. This loop control information becomes part of the incoming instructions that are fetched into IF stage 710. Pipeline controller 750 receives the loop control information from DE stage 720 (or from IF stage 710) and stores the loop control information in loop registers 771 and 772.

Pipeline 750 fetches, decodes, executes and writes-back the instructions in the loop only in the first loop iteration (or first pass through the loop). Pipeline controller 750 stores the decoded instructions from DE stage 720 in decoded instruction registers 761-763 and uses the stored decoded instructions later in the loop without fetching and decoding them again. Instead, the fetch and decode operations in the second and subsequent loop iterations are replaced by idle operations.

In the second and subsequent loop iterations, pipeline controller 750 uses the decoded instructions in decoded instruction registers 761-763 and the loop control information in loop registers 771 and 772 to control the operations of EX stage 730 and WB stage 740. Because the loop iterations are controlled by loop registers 771 and 772 and simple logic circuits in pipeline controller 750, there is very little processing overhead. Furthermore, because IF stage 710 and DE stage 720 are idled during the second and subsequent loop iterations, power consumption is reduced.

The advantages of the present invention may be further demonstrated by an exemplary comparison to the prior art. In the example that follows, it is assumed that four consecutive addition (ADD) operations using the same operands are to be executed, followed by three consecutive subtract (SUB) operations using the same operands.

Figure 8:
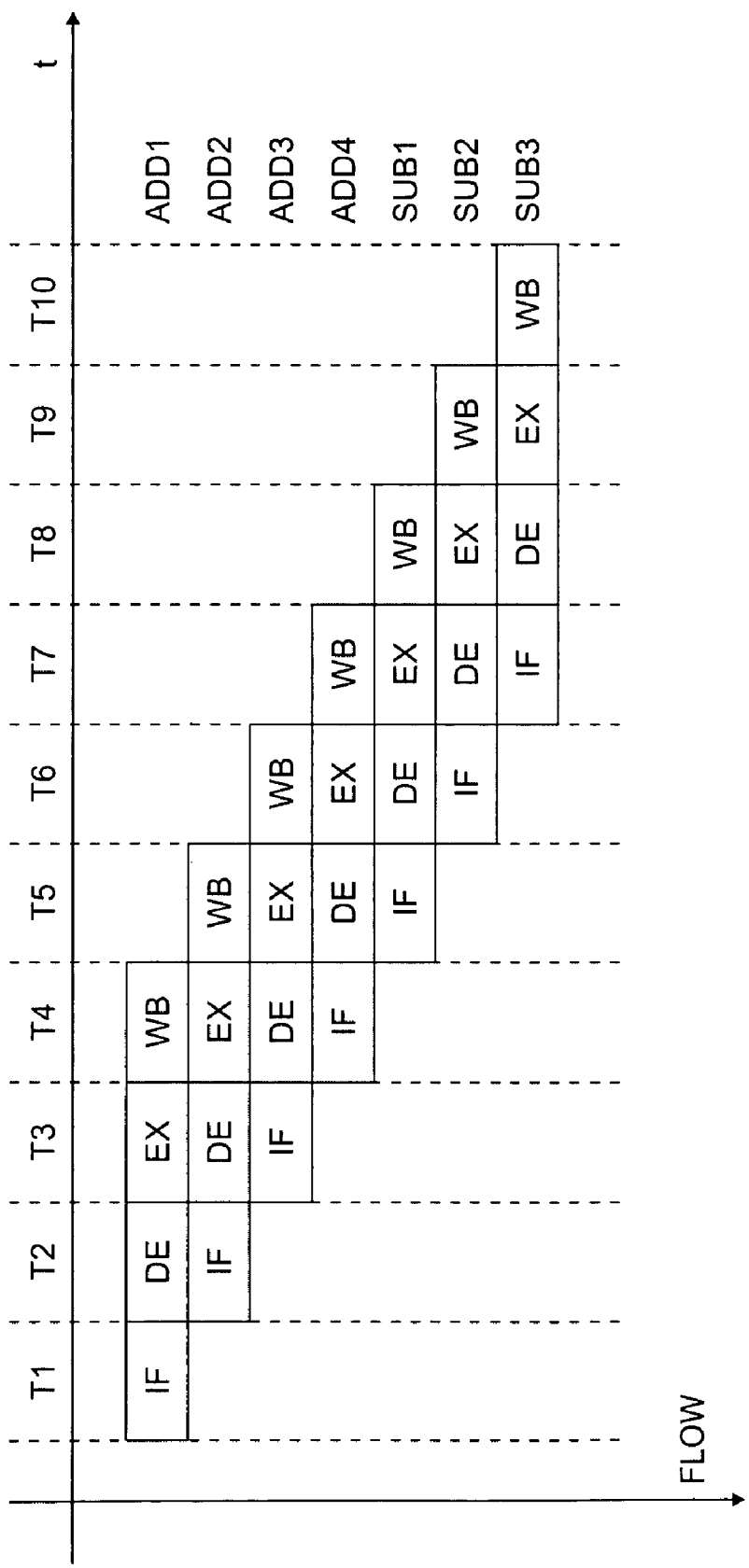
FIG. 8 is a timing diagram of a conventional execution pipeline according to one embodiment of the prior art.

FIG. 8 is a timing diagram of a conventional execution pipeline according to one embodiment of the prior art. The four ADD operations, ADD 1 through ADD4, are executed first, followed by the three subtract operations, SUB 1 through SUB3. Ten time slots, T1 through T10, are shown. In a conventional instruction execution pipeline, the instruction fetch (IF), decode (DE), execute (EX) and write-back (WB) operations of the ADD1 operation occur during time slots T1 through T4, respectively. The IF, DE, EX and WB operations of the ADD2 operation occur during time slots T2 through T5, respectively. The IF, DE, EX and WB operations of the ADD3 operation occur during time slots T3 through T6, respectively. The IF, DE, EX and WB operations of the ADD4 operation occur during time slots T4 through T7, respectively.

The IF, DE, EX and WB operations of the SUB1 operation occur during time slots T5 through T8, respectively. The IF, DE, EX and WB operations of the SUB2 operation occur during time slots T6 through T9, respectively. The IF, DE, EX and WB operations of the SUB3 operation occur during time slots T7 through T10, respectively. As FIG. 8 demonstrates, the four ADD operations and the three SUB operations required a total of seven fetch operations and seven decode operations. Thus, the instruction fetch stage and the decode stage of a conventional pipeline are active and consume power for all seven instructions.

Figure 9:
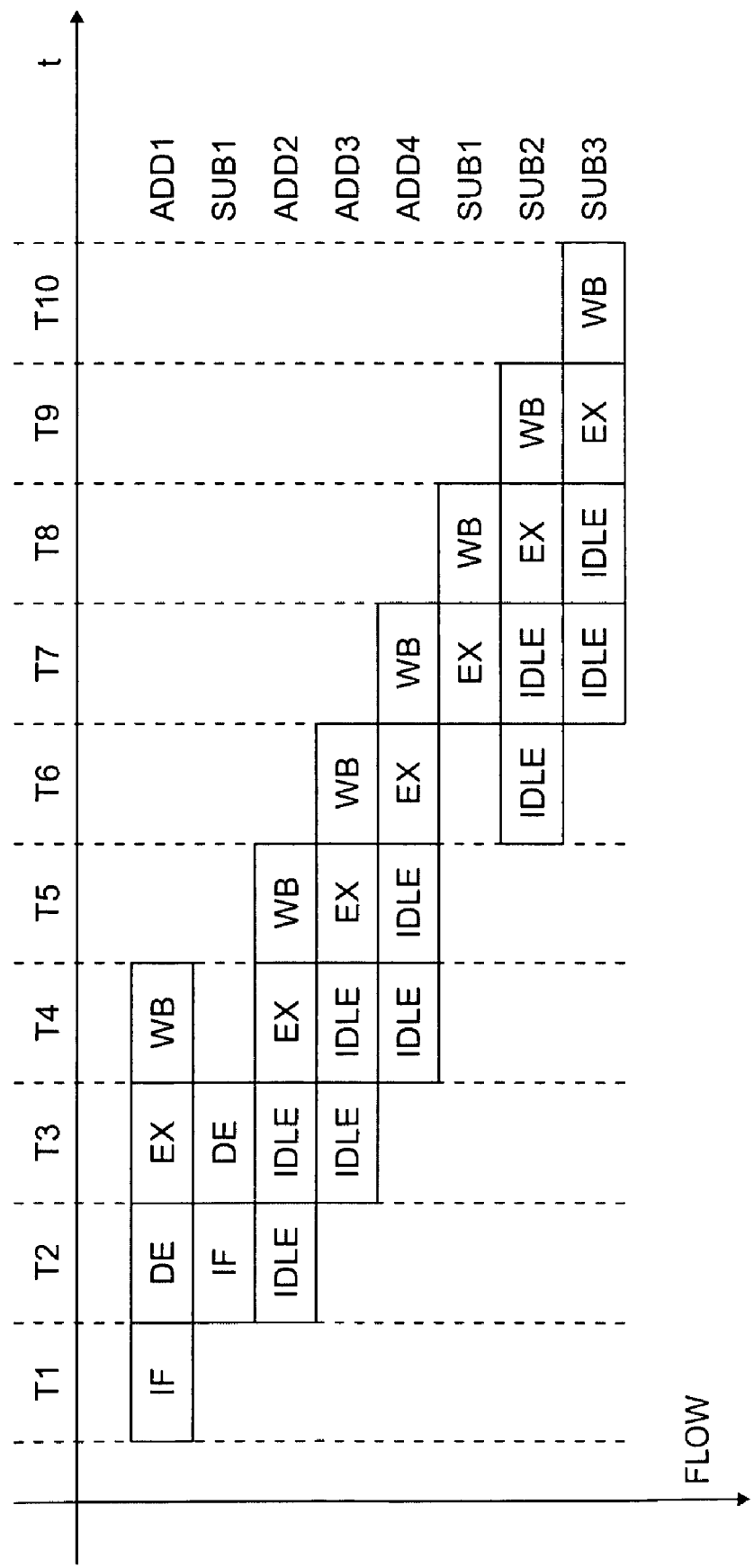
FIG. 9 is a timing diagram of an execution pipeline according to the principles of the present invention.

FIG. 9 is a timing diagram of execution pipeline 700 according to the principles of the present invention. In instruction execution pipeline 700, the instruction fetch (IF), decode (DE), execute (EX) and write-back (WB) operations of ADD1 operation occur during time slots T1 through T4, respectively. However, during the first loop iteration, the decoded ADD1 instruction may be stored in, for example, decoded instruction register 761 and the loop control information for the four ADD instructions may be stored in, for example, loop register 771. Since the ADD loop contains only one ADD instruction that is executed four times, the AL field contains 1 and the Count field contains 4.

While the first ADD instruction is being processed, the SUB1 instruction may-be fetched and decoded for later use. Thus, the instruction fetch (IF) operation and the decode (DE) operation of the SUB1 operation occur during time slots T2 and T3, respectively. The decoded SUB1 instruction may be stored in, for example, decoded instruction register 762. The loop control information for the three SUB instructions may be stored in, for example, loop register 772. Since the SUB loop contains only one SUB instruction that is executed three times, the AL field contains 1 and the Count field contains 3.

At this point, pipeline controller 750 contains all of the necessary decoded instruction information and loop control information to control the execution of the remaining ADD and SUB operations. The IF and DE operations of the ADD2 operation are replaced with idle operations during time slots T2 and T3 and the EX and WB operations of the ADD2 operation occur during time slots T4 and T5, respectively. The IF and DE operations of the ADD3 operation are replaced with idle operations during time slots T3 and T4 and the EX and WB operations of the ADD3 operation occur during time slots T5 and T6, respectively. The IF and DE operations of the ADD4 operation are replaced with idle operations during time slots T4 and T5 and the EX and WB operations of the ADD4 operation occur during time slots T6 and T7, respectively.

Since the subtract instruction was already fetched and decoded during the IF and DE operations of the SUB1 instruction, and this information was stored in decoded instruction register 762 and loop register 772, the three subtract operations may be executed without further fetch and decode operations. The IF and DE operations of the SUB1 operation were already performed during time slots T2 and T3, so the EX and WB operations of the SUB1 operation occur during time slots T7 and T8, respectively. The IF and DE operations of the SUB2 operation are replaced with idle operations during time slots T6 and T7 and the EX and WB operations of the SUB2 operation occur during time slots T8 and T9, respectively. The IF and DE operations of the SUB3 operation are replaced with idle operations during time slots T7 and T8 and the EX and WB operations of the SUB3 operation occur during time slots T9 and T10, respectively.

Pipeline 700 may decode another set of instructions while the current set of instructions is executed in the loop. This reduces delay. In the example above, the SUB instruction is fetched and decoded while the ADD instruction is executed. Since the ADD instruction repeats four time, it is not necessary to fetch and decode it again. However, since pipeline controller 750 is able to determine (i.e., Count field=4) that the ADD instruction is to be executed four times, pipeline controller 750 causes IF stage 710 to fetch another set of instruction (i.e., the SUB instruction) while the ADD instruction is decoded and executed.

Once the ADD1 through ADD4 instructions are completed, pipeline controller 750 can cause IF stage 710 to fetch a third instruction while the SUB1 through SUB3 instructions are being processed. Again, this reduces delay time. For instructions that are not in a loop or that are not executed repetitively, instruction execution pipeline 700 operates in a conventional manner, as in FIG. 8.

In the examples in FIGS. 8 and 9, simple loops containing only one instruction were described. However, loops containing more than one instruction may be used. For example, if a loop containing an addition operation, a subtract operation and a multiply operation (in that order) is to be performed ten times on the same operands, pipeline controller 750 stores the decoded ADD, SUB and MULT instructions in decoded instruction registers 761-763 and then stores the loop control information in, for example, loop register 771. In this example, the Start Address field contains the address of the ADD instruction, the Address Length field contains the value 3 (i.e., the length of the loop), and the Count field contains the value 10 (i.e., the number of loop iterations).

Although the present invention has been described with an exemplary embodiment, various changes and modifications may be suggested to one skilled in the art. It is intended that the present invention encompass such changes and modifications as fall within the scope of the appended claims.

What is claimed is:

1. An instruction execution pipeline for use in a software-defined radio data processor comprising:
   an instruction fetch stage; a decode stage; an execution stage; a write-back stage;
   said instruction execution pipeline repetitively executes a first loop of instructions by fetching and decoding a first instruction associated with said first loop during a first iteration of said first loop, storing first decode instruction information associated with said first instruction during said first iteration of said first loop, using said stored first decoded instruction information during at least a second iteration of said first loop, and replacing said fetching and said decoding of said first instruction during at least said second iteration of said first loop with idle operations, and repetitively executes a second loop of instructions by fetching and decoding a second instruction associated with said second instruction during said first loop, using said stored second decoded instruction information during at least a first iteration of said second loop, and replacing said fetching and said decoding of said second instruction during at least said first iteration of said second loop with idle operations;

wherein said instruction fetch stage is idle during said at least said first iteration of said second loop and said decode stage is idle during said at least a said first iteration of said second loop; and a pipeline controller comprising:
a first decoded instruction register storing said first decoded instruction information during said first iteration of said first loop;
a second decoded instruction register storing said second decoded instruction information during said first loop;
a first loop register storing first loop control information associated with said first loop of instructions during said first iteration of said first loop; and
a second loop register storing second loop control information associated with said second loop of instructions during said first loop; wherein said first loop register and said second loop register comprises at least a Start Address field, an Address Length field and a Count field.

2. The instruction execution pipeline as set forth in claim 1, wherein said pipeline controller controls said execution stage and said write-back stage; stores said first decoded instruction information associated with said first instruction during said first iteration of said first loop; and stores said second decoded instruction information associated with said second instruction during said first loop.

3. The instruction execution pipeline as set forth in claim 1, wherein said Start Address field stores an address associated with said second instruction.

4. The instruction execution pipeline as set forth in claim 3, wherein said Address Length field stores a length value associated with said second loop of instructions.

5. The instruction execution pipeline as set forth in claim 4, wherein said Count field stores a total number of iterations of said second loop of instructions.

6. A software-defined radio SDR system comprising a reconfigurable data processor, said reconfigurable data processor comprising:
an instruction execution pipeline comprising: an instruction fetch state; a decode stage; an execution stage; a write-back stage;
said instruction execution pipeline repetitively executes a first loop of instructions by fetching an decoding a first instruction associated with said first loop during a first iteration of said first loop, storing first decoded instruction information associated with said first instruction during said first iteration of said first loop, using said stored first decoded instruction information during at least a second iteration of said first loop, and replacing said fetching and said decoding of said first instruction during at least said second iteration of said first loop with idle operations, and
repetitively executes a second loop of instructions by fetching and decoding a second instruction associated with said second loop during said first loop, storing second decoded instruction information associated with said second instruction during said first loop, using said stored second decoded instruction information during at least a first iteration of said second loop, and replacing said fetching and said decoding of said second instruction during at least said first iteration of said second loop with idle operation;

wherein said instruction fetch stage is idle during said at least said first iteration of said second loop and said decode stage is idle during said at least a said first iteration of said second loop; and a pipeline controller comprising:
a first decoded instruction register storing said first decoded instruction information during said first iteration of said first loop;
a second decoded instruction register storing said second decoded instruction information during said first loop;
a first loop register storing first loop control information associated with said first loop of instructions during said first iteration of said first loop; and
a second loop register storing second loop control information associated with said second loop of instructions during said first loop; wherein said first loop register and said second loop register comprises at least a Start Address field, an Address Length field and a Count field.

7. The SDR system as set forth in claim 6, wherein said pipeline controller controls said execution stage and said write-back stage; stores said first decoded instruction information associated with said first instruction during said first iteration of said first loop; and stores said second decoded instruction information associated with said second instruction during said first loop.

8. The SDR system as set forth in claim 6, wherein said Start Address field stores an address associated with said second instruction.

9. The SDR system as set forth in claim 8, wherein said Address Length field stores a length value associated with said second loop of instructions.

10. The SDR system as set forth in claim 9, wherein said Count field stores a total number of iterations of said second loop of instructions.

11. A method of executing software-defined radio SDR instructions in an instruction execution pipeline comprising: an instruction fetch stage, a decode stage, an execution stage, and a write-back stage, the method comprising:
fetching and decoding a first instruction associated with a first loop of instructions during a first iteration of said first loop;
storing first decoded instruction information associated with said first instruction during said first iteration of the first loop;
using the stored first decoded instruction information during at least a second iteration of the first loop;
replacing the fetching and the decoding of the first instruction during at least the second iteration of the first loop with idle operations;
fetching and decoding a second instruction associated with the second loop during the first loop;
storing second decoded instruction information associated with the second instruction during the first loop;
using the stored second decoded instruction information during at least a first iteration of the second loop; and
replacing the fetching and the decoding of the second instruction during at least the first iteration of the second loop with idle operations;

wherein said instruction fetch stage is idle during said at least said first iteration of said second loop and said decode stage is idle during said at least a said first iteration of said second loop; and a pipeline controller comprising:

a first decoded instruction register storing said first decoded instruction information during said first iteration of said first loop;

a second decoded instruction register storing said second decoded instruction information during said first loop;

a first loop register storing first loop control information associated with said first loop of instructions during said first iteration of said first loop; and a second loop register storing second loop control information associated with said second loop of instructions during said first loop; wherein said first loop register and said second loop register comprises at least a Start Address field, an Address Length field and a Count field.

* * * * *

UNITED STATES PATENT AND TRADEMARK OFFICE
CERTIFICATE OF CORRECTION

PATENT NO. : 7,669,042 B2
APPLICATION NO. : 11/150427
DATED : February 23, 2010
INVENTOR(S) : Eran Pisek et al.

Page 1 of 1

It is certified that error appears in the above-identified patent and that said Letters Patent is hereby corrected as shown below:

Column 2, line 4, delete "INSRTUMENTS" and replace with --INSTRUMENTS--;

Column 11, claim 6, line 52, delete "state" and replace with --stage--;

Column 11, claim 6, line 55, delete "an" and replace with --and--.

Signed and Sealed this
Twenty-fourth Day of May, 2011

David J. Kappos
*Director of the United States Patent and Trademark Office*